US009842119B1

(12) United States Patent
Schwartz et al.

(10) Patent No.: US 9,842,119 B1
(45) Date of Patent: Dec. 12, 2017

(54) PLACEHOLDER ELEMENT FOR ASSET MODELING AND MIGRATION PLANNING

(71) Applicant: EMC IP Holding Company LLC, Hopkinton, MA (US)

(72) Inventors: Michael Schwartz, Rocky Hill, CT (US); Karen Murphy, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 379 days.

(21) Appl. No.: 14/673,283

(22) Filed: Mar. 30, 2015

(51) Int. Cl.
*G06F 17/30* (2006.01)
(52) U.S. Cl.
CPC .............................. *G06F 17/30221* (2013.01)
(58) Field of Classification Search
CPC ......... G06F 17/30221; G06F 17/30235; G06F 17/30238
USPC ....... 707/639, 641, 649, 651, 654, 659, 660, 707/802, 812
See application file for complete search history.

(56) References Cited

U.S. PATENT DOCUMENTS

| | | | | |
|---|---|---|---|---|
| 5,873,103 | A * | 2/1999 | Trede | G06F 3/0617 |
| 6,708,187 | B1 * | 3/2004 | Shanumgam | H04L 41/0233 |
| 7,032,022 | B1 * | 4/2006 | Shanumgam | H04L 41/0893 |
| | | | | 707/999.009 |
| 8,122,414 | B1 * | 2/2012 | Lindop | G06F 17/5072 |
| | | | | 716/118 |
| 8,495,026 | B1 * | 7/2013 | Gunda | G06F 17/30079 |
| | | | | 707/661 |
| 9,336,039 | B2 * | 5/2016 | Pershin | G06F 9/45558 |
| 2016/0239349 | A1 * | 8/2016 | Mitkar | G06F 9/461 |
| 2016/0357545 | A1 * | 12/2016 | Linn | G06F 8/62 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Greta Robinson
(74) *Attorney, Agent, or Firm* — Ryan, Mason & Lewis, LLP (57) ABSTRACT

Techniques for providing an automatically configured placeholder element that can be used during asset modeling and migration planning when a configuration element is not available. For example, a method comprises the following steps. A determination is made that an actual element to be used in a configuration change associated with a data storage system is unavailable. A logical placeholder element is created in a representation of a state of the data storage system to substitute for the unavailable actual element, and a configuration of the logical placeholder element in the representation of the state of the data storage system is based on one or more settings in the unavailable actual element. At least one of configuration and migration planning is performed using the logical placeholder element, and the logical placeholder element is merged with the actual element in the representation of the state of the data storage system once the actual element becomes available.

20 Claims, 8 Drawing Sheets

_(1)_
PLACEHOLDER ELEMENT FOR ASSET MODELING AND MIGRATION PLANNING

FIELD

The field relates generally to asset modeling and migration planning, and more particularly to a placeholder element that can be used during asset modeling and migration planning when a configuration element is not available.

BACKGROUND

Migration planning and operations for data storage systems involve coordination of a significant amount of asset reconfiguration/configuration activities and configuration migrations. Event windows used in migration planning include a collection of migration events in a particular time frame and using particular assets. An event window can contain multiple point in time snapshots. A "snapshot" is a representation of a state of a system at a particular point in time.

The use of event windows and snapshots in migration planning operations facilitates the planning of a data storage system as the system goes through different states during a set of configuration changes. It is to be understood that a data storage system may be part of a datacenter. Event windows and snapshots allow an administrator of the datacenter to plan updates to the configuration of the data storage system at multiple points in time. The ability to simulate a change to a representation of the datacenter (or data storage center) is referred to as modeling, while actually implementing a change to the datacenter is referred to as migration. For example, an administrator can model what a datacenter would look like given a proposed change to certain resources of the datacenter, while the actual implementation of the resource change would be considered a migration.

When planning a migration, known processes for making configuration changes typically require a user to wait until a new element is delivered before starting configuration changes, resulting in increased time on site completing configuration changes, an increased number of unplanned configuration changes, and a high risk of unexpected configuration changes.

Accordingly, there is a need for improvement of the known processes for configuration changes, when new configuration elements are added.

SUMMARY

Embodiments of the invention provide a placeholder element that can be used during asset modeling and migration planning when a configuration element is not available.

For example, in one embodiment, a method comprises the following steps. A determination is made that an actual element to be used in a configuration change associated with a data storage system is unavailable. A logical placeholder element is created in a representation of a state of the data storage system to substitute for the unavailable actual element, and a configuration of the logical placeholder element in the representation of the state of the data storage system is based on one or more settings in the unavailable actual element. At least one of configuration and migration planning is performed using the logical placeholder element, and the logical placeholder element is merged with the actual element in the representation of the state of the data storage system once the actual element becomes available.

In another embodiment, an article of manufacture is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, embodiments of the present invention provide a logical placeholder configuration element that can be created and used in migration planning software to represent a physical asset that is not yet available. Operations, such as modeling and migration, can be performed on the placeholder element in a migration plan until the actual element becomes available. When the actual element is available, its configuration can be automatically merged with the placeholder configuration.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1:
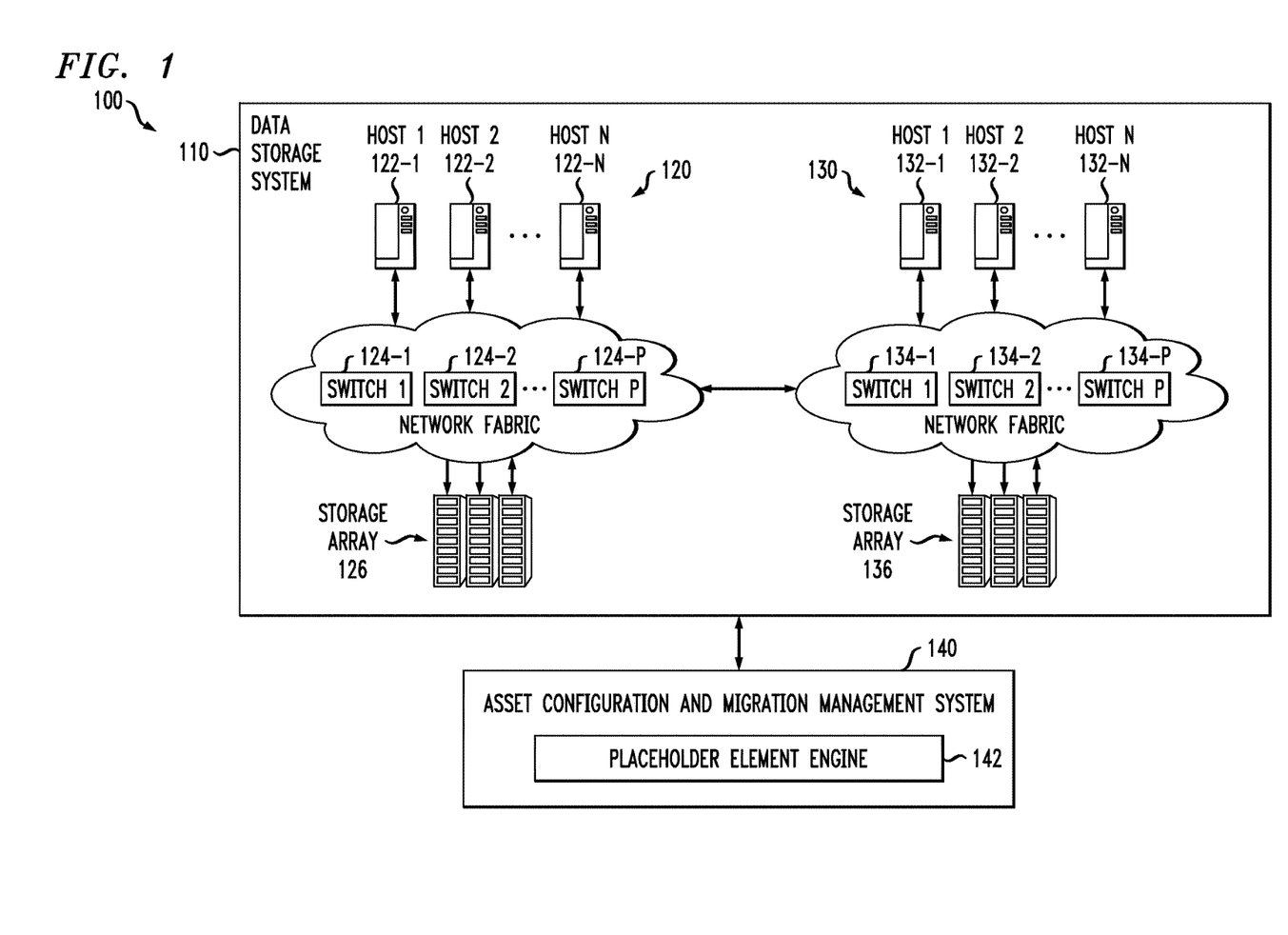
FIG. 1 shows a data storage environment with an asset configuration and migration management system according to an embodiment of the invention.

FIG. 1 shows a data storage environment with storage array replication according to an embodiment of the invention. As shown in data storage environment 100 in FIG. 1, a data storage system 110 includes a first data storage subsystem 120 and a second data storage subsystem 130. The first data storage subsystem 120, as shown, includes a plurality of host computing devices 122-1, 122-2, . . . , 122-N, a plurality of switches 124-1, 124-2, . . . , 124-P implemented as part of a network fabric (e.g., Fibre Channel fabric), and at least one storage array 126. Similarly, the second data storage subsystem 130, as shown, includes a plurality of host computing devices 132-1, 132-2, . . . , 132-N, a plurality of switches 134-1, 134-2, . . . , 134-P implemented as part of a network fabric (again, e.g., Fibre Channel fabric), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (or logical unit numbers) (LUNs). Thus, each subsystem can have both logical execution components and physical execution components. Also, it is to be understood that each storage array may have one or more physical storage devices associated therewith.

Also shown in system environment 100 is an asset configuration and migration management system 140. The management system 140 is a computer-based tool used by administrators of the data storage system 110 to plan and automate asset configurations and migration of asset configurations within the data storage system. Data can be, for example, acquired, distributed, and/or migrated from storage array 126 in subsystem 120 to storage array 136 in subsystem 130, or vice versa. Also, data may need to be acquired, distributed and/or migrated from one storage array to another storage array, from one asset to another asset, from a storage system to a virtual storage environment, from one a virtual storage environment to another a virtual storage environment, and/or from a virtual storage environment to a storage system within the same subsystem or between subsystems. Reasons for the data acquisition, distribution and/or migration are application-dependent, but could be driven by data and resource management decisions made by the infrastructure provider.

The management system 140 includes placeholder element engine 142, which controls provision of a placeholder element that can be automatically configured and used during asset modeling and migration planning when a configuration element is not available.

Embodiments of the present invention provide a logical placeholder element that can be used during asset modeling and migration planning as a substitute for an unavailable configuration element (e.g., the element has not yet been delivered on site). Using, for example, migration planning software, a configuration of a placeholder element can be created and changes can be made to the configuration of the placeholder element based on a migration plan. When the actual element becomes available, the configuration of the actual element can be automatically merged with the placeholder configuration that already has the required changes. Accordingly, by substituting the unavailable configuration element with a placeholder configuration element, and not having to wait for the actual configuration element to arrive, users are able to complete more planning offsite before an element is delivered, reduce the number of unexpected configuration changes, and reduced the time on site for completing the configuration changes.

For example, a customer may request or purchase a new asset, such as an array, and wants a supplier to begin configuration of an environment including the array right after purchase, but prior to the supplier being able to manufacture and deliver the array. In accordance with an embodiment of the present invention, the supplier is able to create a logical placeholder element based upon its understanding of how the array will be structured. This understanding can be derived from, for example, a template for the configuration of the element, one or more design specifications (e.g., from scratch, meaning without a predetermined template), an existing element, or some combination thereof, etc. Using migration planning software, for example, in the form of event windows and snapshots, a user can plan and execute configuration changes that would involve the actual element if it were present, including, but not limited to, migration of data to and from different assets, and connecting/interfacing different assets with each other. In accordance with an embodiment of the present invention, during migration and migration planning, the migration planning software treats and performs operations on the placeholder element as if it were the actual element. Upon receipt of the actual element (e.g., the constructed array), a merging is performed, which reconciles the configuration (e.g., structure, settings, dependencies, assignments) of the actual element with the configuration of the logical placeholder element as it was created. A user is alerted as to conflicts between the configuration of the actual element and the configuration of the logical placeholder element. Conflicts can include, but are not limited to, port assignments and serial numbers not matching on an asset scale, storage locations not existing on a migration scale, etc. Upon learning of the conflicts, a user has options such as, for example, modifying or rejecting all or part of a migration plan, changing certain relationships between assets or parts of assets, reassigning storage locations or transfer points, etc., based on the conflicts. Adjustments made upon being alerted of the conflicts can also be automated, and performed by the placeholder element engine 242. Once the conflicts have been resolved, or there are no conflicts detected, a placeholder element flag can be removed, the migration plan can be completed, and operations, such as, for example, data transfer and assignment of dependencies deemed to have been performed on the logical placeholder element, can be performed on the actual element as if it were initially present. As such, embodiments of the present invention aim to simplify the process and the time it takes to effectuate configuration changes when configuration elements are not readily available.

As used herein, a "placeholder", "placeholder element," or "placeholder configuration element" refers to a logical placeholder used in software to represent physical and logical configuration of an element or elements that are not available (e.g., have not yet arrived at a customer site). In accordance with a non-limiting illustrative embodiment of the present invention, the software used in connection with configuring a placeholder element is migration planning software that utilizes snapshots and event windows, and is described further herein.

As used herein, a "configuration element" or "element" includes, but is not limited to, an asset, such as, for example, a host, switch, fabric, array, server, virtual storage software and hardware, a cloud entity, etc. A configuration element is typically connected to one or more configuration elements. A physical or actual configuration element or element can refer to a tangible device. A logical placeholder element can represent the physical or actual element when the physical or actual element is unavailable.

In accordance with embodiments of the present invention, configuration changes and migration can, for example, be performed: (1) within a single asset, e.g., by creating local replica for a range of devices, and migrating thick devices to thin devices; (2) between two assets, e.g., the assignment of devices from one host to another host, and replacing an existing switch with a new switch; (3) from one to a plurality of assets, e.g., by creating multiple remote replicas for a particular device, and replacing an existing switch which has a single fabric with multiple switches with failover zones; (4) from a plurality of assets to one asset, e.g., by migrating two switches to one switch, and migrating devices from multiple arrays to a single virtual storage environment; and/or (5) from a plurality of assets to a plurality of assets.

As used herein, "configuration" of an element, "element configuration" and "configure" can refer to an original configuration of an element (e.g., initially configuring an element) or a reconfiguration of an element (e.g., reconfiguring an element that was previously configured).

As used herein, a "virtual storage environment" may include virtual storage technology that enables applications to remain up and running during any of a variety of planned and unplanned downtime scenarios. For example, the virtual storage technology can permit data movement, taking technologies and other clusters that were built assuming a single storage instance and enabling them to function across arrays and across distance. An example of virtual storage technology includes VPLEX®, which is commercially available from EMC Corporation of Hopkinton, Mass.

As used herein, an event window contains elements that are being configured/reconfigured, e.g., hosts, arrays, switches, etc. In accordance with embodiments, associated elements that are not being configured/reconfigured can also be part of an event window. An event window can contain multiple migration groups and point in time snapshots. In accordance with an embodiment, an event window starts at a specific date and has a fixed end date. For example, an event window may represent a particular weekend.

As used herein, a migration group refers to a group of elements and associated configurations that will be/are migrated, e.g., hosts and associated array devices. As noted above, migration may occur, for example, within a particular asset or between assets, and there can be multiple migration groups in an event window.

As used herein, a snapshot refers to a point in time description of the state of all elements, for example, a point in time representation of a data storage system. A snapshot may include a set of planned configuration changes. Snapshots can contain a complete copy of the information in connection with the environment or just sufficient information to represent the environment at different points in time. As used herein, a "current snapshot" refers to a present state of the data storage system. In accordance with embodiments of the present invention, information is updated in a current snapshot by importing/re-importing data and/or assets. Data collected from a storage environment is imported into the current snapshot using a data source, e.g., SYMAPI. In accordance with embodiments of the present invention, modeling is not performed in this snapshot. As used herein, a "migration state snapshot" refers to a snapshot that stores a configuration(s) that is required for completing migration, e.g., masking/mapping. In accordance with embodiments of the present invention, modeling can be performed in this snapshot. As used herein, a "production state snapshot" refers to a snapshot that facilitates configuration changes that are required after a migration to get the storage environment to its desired end state. In accordance with embodiments of the present invention, modeling can be performed in this snapshot. It is to be understood that embodiments of the present invention are not necessarily limited to storage snapshots, and may generally apply to other configurations or representations used in migration planning software when modeling systems at different points in time to represent the state of a system. The system can be, for example, a data storage system.

Figure 2:
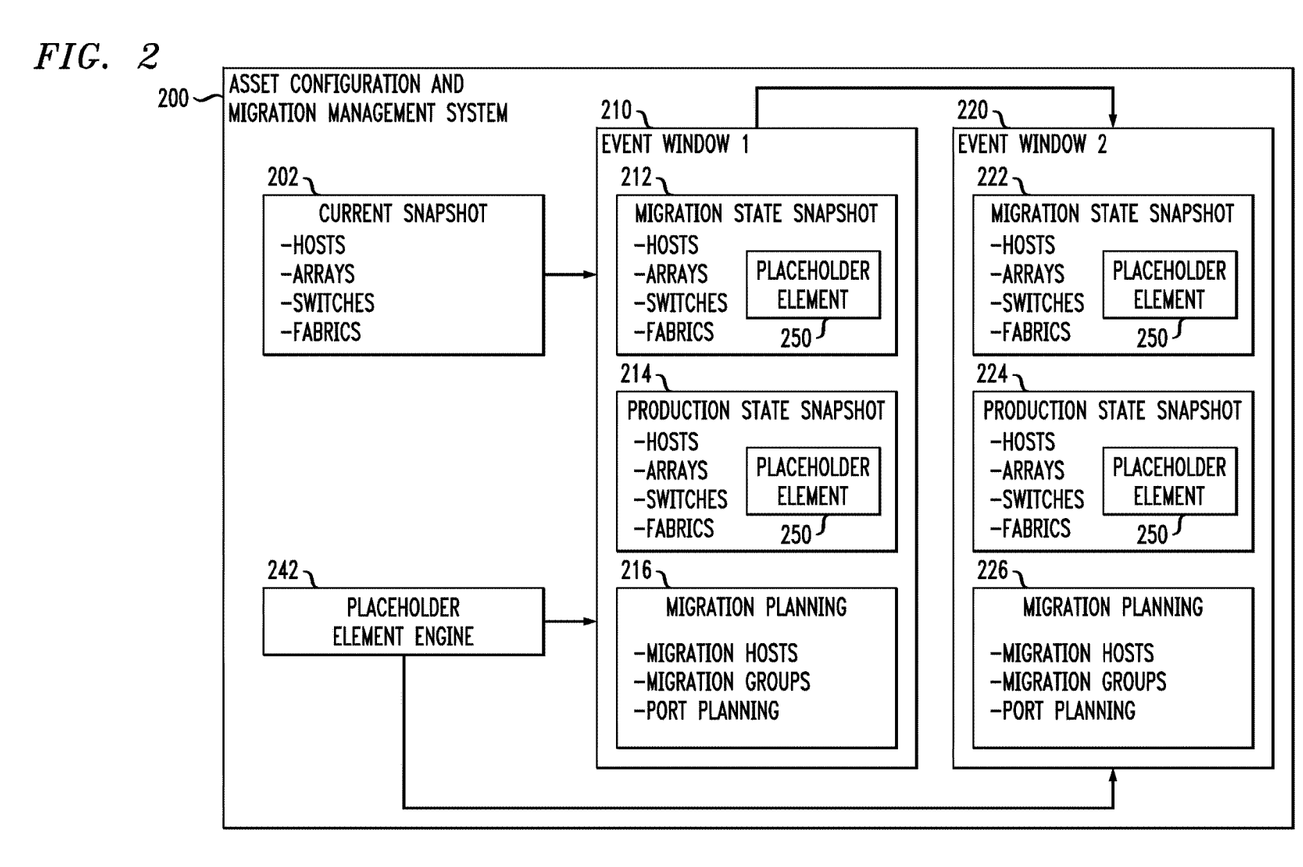
FIG. 2 shows an asset configuration and migration management system according to an embodiment of the invention.

FIG. 2 shows an asset configuration and migration management system 200 according to an embodiment of the invention. The system 200 includes a current snapshot 202 and event windows 210, 220 representing different blocks of time (e.g., a first week, and a subsequent second week). It is to be understood that the depicted event windows are for purposes of illustration, and that there may be more or less event windows having different snapshots. The event windows 210 and 220 each include a migration state snapshot 212, 222 and a production state snapshot 214, 224. The snapshots 202, 212, 214, 222 and 224 include, for example, host, array, switch and fabric information. In accordance with an embodiment of the present invention, an event window at least groups a migration state snapshot and a production state snapshot together. The event window represents a defined set of configuration changes to the storage environment over a predetermined period of time (e.g., if a migration occurs on a particular weekend, the event window represents that weekend). As seen in FIG. 2, the event windows 210 and 220 further include migration planning data 216, 226 including, for example, migration hosts, groups and port planning Referring to FIG. 2, the event windows 210, 220 are pending, i.e., subject to modification. In accordance with an embodiment of the present invention, the current snapshot 202 can be the starting point for event window 210, supplying an initial configuration for the migration state snapshot 212. As shown in FIG. 2, a placeholder element 250 is added to the migration state snapshot 212 when a user is planning to add a new element to an environment, but the element has not yet been delivered on site, and the user wants to introduce the configurations required to setup the element and perform migration planning. As a result of the placeholder element 250 being added to migration state snapshot 212, the production state snapshot 214, and the migration and production state snapshots 222 and 224 of a subsequent event window 220 (e.g., representing a later block of time), can each include the placeholder element 250 that is used during asset modeling and migration planning as a substitute for an unavailable configuration element. In accordance with an embodiment of the present invention, the placeholder element 250 is indicated as a placeholder element to a user on a user interface, and a system on which the migration plan is being executed does not view the element 250 as a placeholder element, but as an actual element of the system.

In accordance with an embodiment of the present invention, it is determined that an element needed in connection with a configuration change is not available. A template or existing element, such as, for example, an existing host, array, switch, fabric, etc., that the new placeholder element 250 will be based on, is selected. The determination that an element is unavailable, and the selection of a template or existing element on which the new placeholder element 250 will be based, can be performed by a user, or automatically by, for example, the placeholder element engine 242. As noted above, it is to be understood that embodiments of the present invention are not necessarily limited to the use of snapshots, and may generally apply to other configurations or representations used when modeling systems at different points in time.

With respect to the placeholder element 250, dependencies with other elements are automatically detected by, for example, the placeholder element engine 242. For example, where dependencies represent the relationship of the placeholder with other assets, the software is programmed to understand relationships between assets, e.g., Array #1 connects to Switch A, and then to Server X. If the placeholder, in this example, represents the array, the software will ensure that the connections are maintained when the placeholder is replaced with the real array.

Based on the settings required in the new element currently being modeled by the placeholder element 250, the placeholder element 250 is configured. Configurations can include, for example, new devices, masking, mappings, etc. The configuration can be performed by a user, whereby the user enters data that represents the placeholder element, e.g., a storage array model type, into software. The configuration can also be performed automatically by, for example, the placeholder element engine 242, whereby the placeholder element engine 242 accesses data to represent the placeholder element 250, and configures the placeholder element 250. In accordance with embodiments of the present invention, the configurations can be automatically generated in a migration group.

When the new element becomes available, the placeholder element is automatically merged with the new element, using, for example, the placeholder element engine 242. At any stage while using the placeholder element, it is possible to generate scripts that will be run against the actual element. For example, scripts can be generated to update configurations on elements where changes are required as a result of the configuration and migration. Scripts can also be generated which could be used to automatically create any new fabrics/zones that are required for an environment. The scripts can be executed during implementation of the actual element.

The placeholder element 250 is part of a snapshot in a manner similar to available configuration elements until the placeholder element 250 is automatically merged with the new element when the new element becomes available. As noted above, in accordance with an embodiment of the present invention, the placeholder element 250 is indicated as a placeholder element to a user on a user interface, and a system on which the migration plan is being executed does not view the element 250 as a placeholder element, but as an actual element of the system. Upon merging, the newly available element can replace the placeholder element 250 in the snapshots. Prior to merging, operations, such as modeling and migration planning can be performed on the placeholder element 250 until the actual element becomes available. More specifically, according to an embodiment, a user creates logical placeholder in the migration planning software, and configures the placeholder and/or performs migration planning, including configuration updates, with that placeholder. When a physical asset which the placeholder was representing becomes available, and configuration data can be collected from the physical asset, the data from the physical asset is imported and merged with the placeholder data that is present as a result of configuring the placeholder and/or performing migration planning According to an embodiment, a reconciliation occurs upon import and conflicts as indicated above are made known to a user, and the user can then make adjustments if conflicts are detected. Alternatively, conflicts can be resolved automatically by the placeholder element engine 242.

In a non-limiting illustrative embodiment, a user plans to add a new array to an environment, but the array has not yet been delivered on site (or is unavailable for some other reason), and the user wants to update the configurations required to setup the array. A logical placeholder array can be created by, for example, cloning an existing array, by using, e.g., Symmetrix® SYMAPI bin file, CLARiiON® ArrayConfig file, both commercially available from EMC Corporation of Hopkinton, Mass. The placeholder array can also be built from scratch (e.g., from one or more design specifications without a predetermined template) or from template configurations. Associations of other elements (i.e., dependencies) to the logical placeholder array are automatically detected. The configuration of the placeholder array can be modified with changes that are required, e.g., the array may need new devices, masking, mappings, etc. Configurations of elements that are connected to the placeholder element can also be updated, e.g., zoning, virtualization of devices, etc. When the new array is available, its configuration is automatically merged with the placeholder configuration. Unique identifiers are taken from the new array, e.g. serial number, etc., and other configurations are merged.

In a non-limiting illustrative example, a user plans to add an EMC® VMAX®3 Symmetrix® array ("VMAX®3") to an environment. The environment currently includes a VMAX®3, VMAX®1, DMX®, CLARiiON® and Hitachi® Data Systems (HDS) arrays in their environment. The user or system can, for example, choose to clone one of the existing arrays, use a template VMAX®3 array, or build the placeholder array from scratch. A combination of these options can also be used when creating the placeholder asset. The best choice can depend on which is the best match to minimize the required time to update the configurations' needed to configure the new asset and connected assets. The following looks at each of the options that are available.

Building the asset from scratch can be the best option if an asset is being added to a new environment, and no suitable template asset from which to create the new asset is available, or the existing environment does not have an asset that is suitable as a base asset, and no suitable template asset from which to create the new asset is available. When the option is chosen to build the placeholder asset from scratch, it is still possible to use associated assets as bases to create associations with the placeholder asset, e.g., a host, or a switch could be used as a base asset for association with a placeholder array asset.

Cloning an asset that exists in an environment can be a good choice if a main concern is to use an asset that is of the same type and similar configuration as the new asset that is planned to be added to the environment. In the case of an array asset, cloning can allow for masking, pools and array type specific features to be easily configured on the new array, as they can be cloned from an existing array of the same type. Modifications can be made to the placeholder asset to suit the requirements of the new asset. This is not the only consideration when looking at the complexity of setting up the new asset. The following should also be considered: what switches does the asset need to be connected to (both directly and indirectly); what hosts need to access the asset; what virtual appliances need to access the asset; will the devices on an array be virtualized before they are visible to the host; what fabric configurations need to be setup; and what arrays need to connected to the asset.

If the asset the new placeholder asset is being cloned from has similar connectivity to other assets, then it can be a good candidate to be used for cloning. For example, an existing asset is a good candidate to be cloned if it already has required hosts already connected, required switches already connected, fabrics configuration already setup for hosts and virtual appliances, virtual appliances already connected, and required arrays already connected. If, however, the time it will take to configure the connectivity with these assets is longer than it takes to change a configuration within the placeholder asset, then it may be better to use another option.

A template configuration can be used if no assets exist in the environment or the assets that exist are not of the same type that are desired or needed to be created. In this case, a template asset can be used to create the placeholder asset. Other base assets can be used to clone connectivity, e.g., host or virtual appliance.

Embodiments of the present invention also contemplate adding multiple placeholder assets. This works in the same way as adding one placeholder asset. When second and subsequent placeholder assets are created in an environment, it is assumed that all placeholder assets that were created prior are part of the environment and can be treated the same way as existing assets. According to another embodiment, multiple placeholder assets can be simultaneously added.

The configurations of each placeholder asset can be tracked separately and will not be lost by adding another placeholder asset. If, during a design process, it is found that one or more of the placeholder assets that have been added are no longer needed or need to be reconfigured, then the environment where the placeholder asset has been added is automatically updated to remove or reconfigure the one or more placeholder assets.

In accordance with embodiments of the present invention, regardless of which option is chosen to create a placeholder asset, it can be relatively easy to layer other configurations on top of the placeholder asset. For example, 10 new devices may need to be created in a placeholder array asset which will be visible from a Host A. In accordance with an embodiment of the present invention, a user requests a desired configuration, and the details of how this configuration will be created on the placeholder asset are automatically determined. If a user requests, for example, 10 100 Gb devices in Array A to be visible by Host X, the system can automatically determine the configurations that are required, such as, for example, a pool created for a device, devices created from the pool, and paths from array to host(s).

A manual approach would take a person a significant amount of time to analyze the various options to identify what is the most optimal way to create a new asset in an environment. In accordance with embodiments of the present invention, scenarios are automatically modeled allowing a user review options in a very short period of time. The upfront cost of reviewing different options is low, as opposed to picking a poor option and deciding to go with another option after implementing the poor option. Accordingly, the risks associated with adding a new asset to an environment are lower since configurations within the asset and with associated assets are automatically created. Embodiments of the present invention provide a more agile approach to updating a user environment when one or more assets need to be added.

Figure 3:
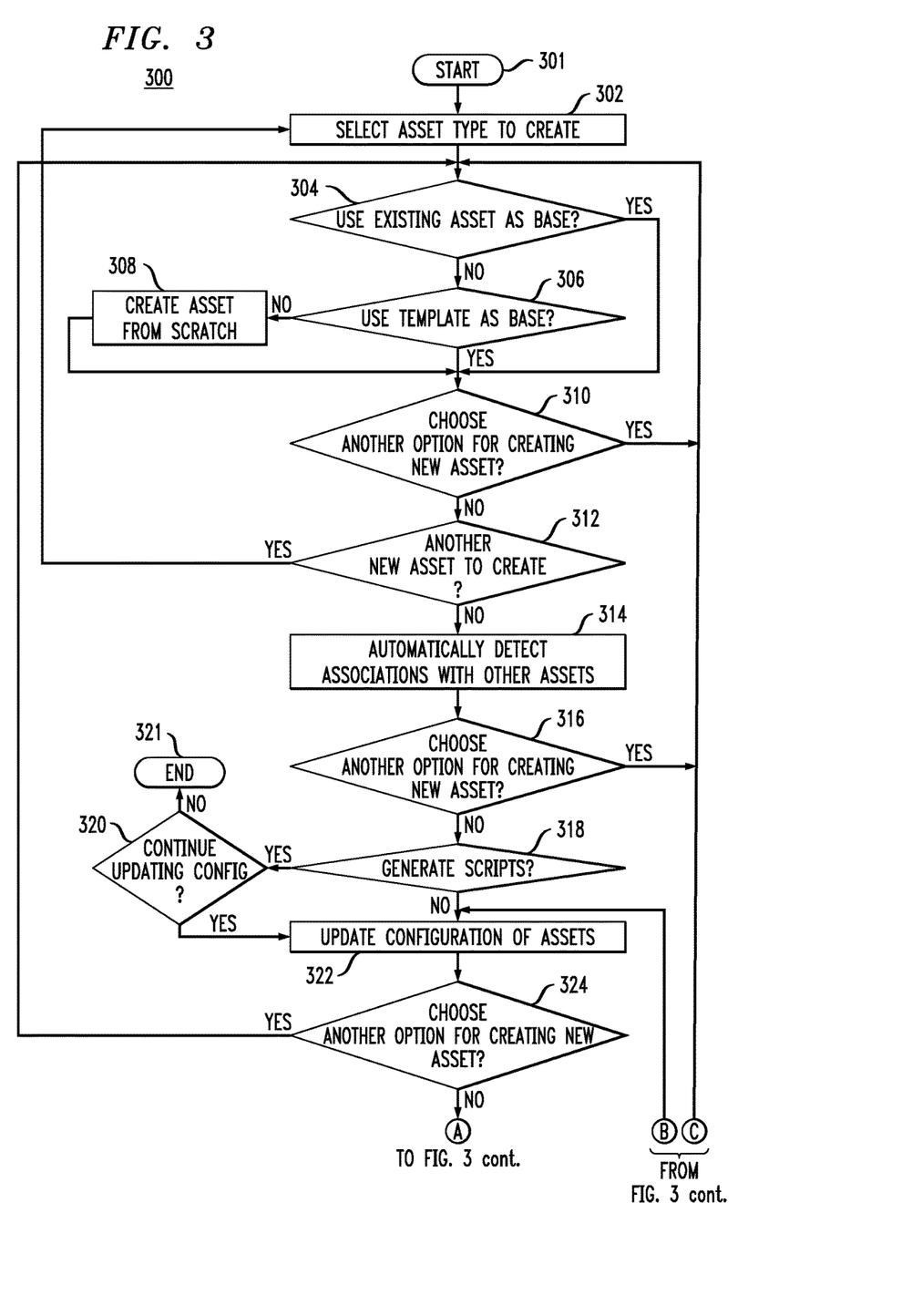
FIG. 3 is a flow diagram illustrating a method for creation of a placeholder element, in accordance with an embodiment of the present invention.

FIG. 3 is a flow diagram illustrating a method for creation of a placeholder element, in accordance with an embodiment of the present invention. At block 302, a user selects an asset type to create. At blocks 304 and 306, it is determined by, for example, the user, or the system, whether to use an existing asset as a base or use a template as a base when creating the placeholder asset. If those two options are not used, the placeholder asset can be created from scratch (block 308). At block 310, the option selected to create the placeholder asset is reviewed, and it is determined whether more than one option is to be selected when creating the placeholder asset. If more than one option is needed, the method can return to block 304 to select the other option. If not, the method proceeds to block 312, where it is determined whether another placeholder element is to be created. If there is another placeholder element to be created, the method returns to block 302. If not, the method proceeds to block 314, where the system automatically detects associations with other assets.

At this point, at block 316, the option(s) selected to create the placeholder asset is reviewed based on the associations with other assets, and it is determined whether more options are to be selected when creating the placeholder asset. If another option is needed, the method can return to block 304 to select the other option. If not, the method proceeds to block 318, where scripts can be generated using the placeholder element. If it is decided to generate scripts at this stage, a determination can be made by, for example, the user or the system, that configuration changes are finished, and process can end at block 321.

If it is decided not to generate scripts at this stage or that further configuration updates are required, the configurations of the placeholder asset and all assets that are associated to the placeholder asset are updated at block 322. At this point, at block 324, the option(s) selected to create the placeholder asset is reviewed, and it is determined whether more options are to be selected when creating the placeholder asset. If another option is needed, the method can return to block 304 to select the other option. If not, the method proceeds to block 326, where scripts can be generated. If it is decided to generate scripts at this stage, it is decided at block 328 whether to continue to update the configuration of the placeholder element(s). If no at block 328, it is decided that no configuration changes are to be made, and the process can be terminated at block 340. If no at block 326, or it is decided at block 328 to continue to update the configuration of the placeholder element(s), the placeholder element is automatically merged with the actual asset at block 330.

At block 332, there is an option to generate scripts at this stage. If yes at block 332, the method can be terminated at block 340. If it is decided not to generate scripts at block 332, it is then decided at block 334 whether more configuration updates of the placeholder element(s) are required. If yes at block 334, the method returns to step 322, or the process can be terminated at block 340. If no at block 334, the method proceeds to block 336, where the option(s)

selected to create the placeholder asset is reviewed, and it is determined whether more options are to be selected when creating the placeholder asset. If another option is needed, the method can return to block 304 to select the other option. If not, the method proceeds to block 340, where the process is terminated.

At block 334, the updates to the placeholder asset and associated assets are not lost. At blocks 310, 316, 324 and 336, the updates to the placeholder asset and associated assets are also not lost, unless they conflict with a new selection for creating the placeholder asset. At block 322, a user has the option of manually updating configurations. If there are multiple assets being added, additional placeholder assets can be created via block 312.

As noted above, it can be possible to use an associated asset as a base to create a placeholder element. This can be used where an asset of the type being created does not exist. An example of this is where a virtual appliance is being added to an environment where none currently exists. In this case, the user would first select to create the virtual appliance from scratch and then go back to block 304 to select the array and host that the virtual appliance will be connected to as base assets.

Figure 4:
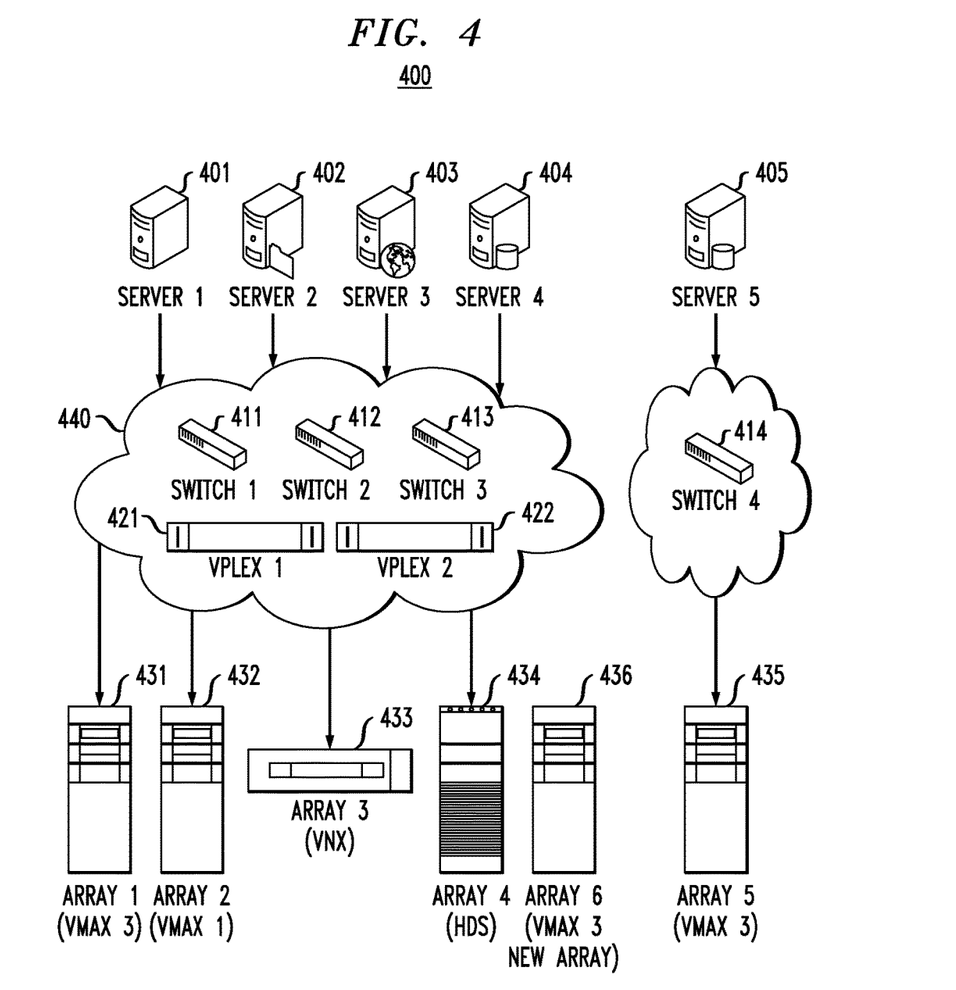
FIG. 4 illustrates an environment for which a placeholder element is created, in accordance with an embodiment of the present invention.

Referring to FIG. 4, in a non-limiting illustrative example, an environment 400 is shown in which there are five hosts: Server1 401, Server2 402, Server3 403, Server4 404 and Server5 405. There are four switches: Switch1 411, Switch2 412, Switch3 413 and Switch4 414. There are two virtual appliances: VPLEX®1 421 and VPLEX®2 422. There are five arrays: Array1 431, which is a VMAX®3, Array2 432, which is a VMAX®1, Array3 433, which is a VNX®, Array4 434, which is a HDS and Array5 435, which is a VMAX®3.

A user wants to add Array6 436, which is a VMAX®3 that will be connected to storage area network (SAN) environment 440 to which Array1, Array2, Array3 and Array4 431, 432, 433, 434 are connected. In this example, there is a template VMAX®3 array configuration available if needed.

A combination of the following can be used when creating the placeholder array: use an existing asset as a base; use a template as a base; and create an asset from scratch. The best choice can depend on which is the best match to minimize the required time to update the configurations needed to configure the new array and connected assets. Reviewing the options in accordance with embodiments of the present invention, building the asset from scratch to create the placeholder element for Array6 436 would require the most work to complete the configuration. Less work would be required to clone from an existing array in the environment or a template configuration. Regardless of which option is selected, it is possible to create the same placeholder array, update the configuration of the array with changes that are required, e.g., new devices, masking, pools, etc., update a configuration of assets that are connected to the array, e.g., zoning, virtualization of devices, etc., merge the placeholder element with the actual array when the actual array is available, update the placeholder array with unique identifiers from the actual array, e.g., serial number, while other configurations are merged, and generate scripts that can be used to update the configuration of the asset and the related assets.

In this example, cloning from Array1 431 appears to be the best option when creating the placeholder array since Array6 436 is also a VMAX®3 to be connected to the SAN 440. If the placeholder array was cloned from an existing array the following options are available: Array1 (VMAX®3), Array2, (VMAX®1), Array3 (VNX®), Array4 (HDS), and Array5 (VMAX®3).

Array1 431 and Array5 435 are VMAX®3 arrays. These are the closest match to Array6 436. Using one of these arrays would reduce the amount of manual configurations that need to be created in the placeholder array. For example, devices, masking, fully automated storage tiering (FAST®) configurations, etc. can be cloned from a VMAX®3. FAST®, commercially available from EMC Corporation of Hopkinton, Mass., automatically moves active data to high-performance storage tiers and inactive data to low-cost, high-capacity storage tiers.

The HDS and VNX® arrays have a different method of creating devices and setting up masking. If these arrays are used, then additional configurations will have to be created when updating the configuration assets.

In this example, cloning from Array1 431 when creating the placeholder array is a better option than cloning from Array5 435. However, assuming for purposes of explanation that Array5 is chosen, the configurations to connect Server1 401, Server2 402, Server3 403 and Server4 404 will have to be created. The user can manually create the connections to these assets. The user can also create the configurations for the switch(es) and virtual appliance(s) through which the servers are connected to the array. A significant amount of updates would be required when updating the configuration of these assets if the connections to the assets were manually created. Still assuming Array5 435 were used for cloning, a more efficient option would be to add Server1, Server2, Server3 and Server4 as associated base assets. Based on existing connections between the servers and switches, the connections to Array5 can be automatically detected. This would reduce the amount of time determining configuration updates required, e.g., zoning, masking, etc.

Array1 431 is already connected to Server1 401, Server2 402, Server3 403 and Server4 404. If Array1 is chosen for cloning, the configuration to connect Array6 436 to Server1, Server2, Server3 and Server4 will be automatically detected. The devices on Array1 can be cloned on Array6. The masking for the cloned devices on Array6 can be cloned based on the masking on Array1. The zoning can be automatically detected based on the array ports on Array1 that are already zoned to host ports on Server1, Server2, Server3 and Server4.

If a template were used to create the placeholder element for Array6, the configurations to connect Server1, Server2, Server3 and Server4 will have to be created. Like with using Array5 for cloning, a user can manually create the connections to these assets and the configurations for the switch(es) and virtual appliances. Accordingly, if a template were used to create the placeholder element, a more efficient option would be to add Server1, Server2, Server3 and Server4 as associated base assets.

Referring again to FIG. 4, in another non-limiting illustrative example, a user plans to replace an existing array in an environment (in this case replace Array4 434 with Array6 436), and would also like to use this opportunity to review the utilization of Array1, Array2 and Array3 to ensure optimal use of storage in the environment.

Similar to the example above, the array (Array6) has not yet been delivered on site (or is unavailable for some other reason), and the user wants to update the configurations required to setup the array. A logical placeholder array can be created by cloning the array that is being replaced. Array6 is a VMAX®3 array. Array1 is also a VMAX®3 array, and is connected to the servers that Array6 will be connected to. In addition, Array1 sub assets are configured in the same way as Array6, e.g., devices, masking, pools, etc. However, Array1 does not contain the sub assets that are being moved to Array6. In other words, the devices that the user wants to create on Array6 do not exist on Array1. Array4 contains these sub assets. Even though Array4 is a different type, it can be a better asset to use when creating the placeholder asset for Array6. The connected assets can be determined, and devices and masking definitions can be taken from Array4. It will not be possible to clone how these sub assets are configured, as both Array 4 and Array6 create them differently.

Once Array4 has been applied as a base for the placeholder array, a VMAX®3 template could be added as a base asset to define how the sub assets are created. This template could have profiles of how the sub assets are created, such as, for example, a FAST profile, naming conventions, and masking configurations.

In this example, another step the user wants to complete is to review the usage of Array1 431, Array2 432 and Array3 433. Assuming it is identified that Array2 432 is near full capacity, it is necessary to move some devices to Array6 436. Array2 432 can be added as a base asset. The user or the system identifies the sub assets that will be moved from Array2 to Array6. The template VMAX®3 array selected after adding Array4 can be used to define the profiles that can be used when moving the sub assets from Array2 to Array6.

When the placeholder array is created, it can be updated with the configurations required. The connected assets can also be updated. The placeholder array is merged with the actual array when it is available. The unique identifiers of the new array are used and other configurations are merged. Scripts are generated, which can be executed on the Array2, Array6 and related assets.

It is not necessary to generate or execute scripts on Array4, as it is being removed from the environment. For security reasons the user may generate and execute scripts to remove all sub assets and configurations from Array4.

In this example, configuration changes that are required on the replacement array are automatically determined by the configuration of the existing array, and applied to the placeholder array. For example, if there are 100 devices masked to hosts on a current array, there will also be 100 devices on the placeholder array. The configuration changes required for replication between the existing array and new array can be setup automatically, using, for example, the placeholder element engine 242. The configuration of the placeholder array can be modified with changes that are required, and the configuration of the new array can be automatically merged with the placeholder configuration as described above.

Figure 5:
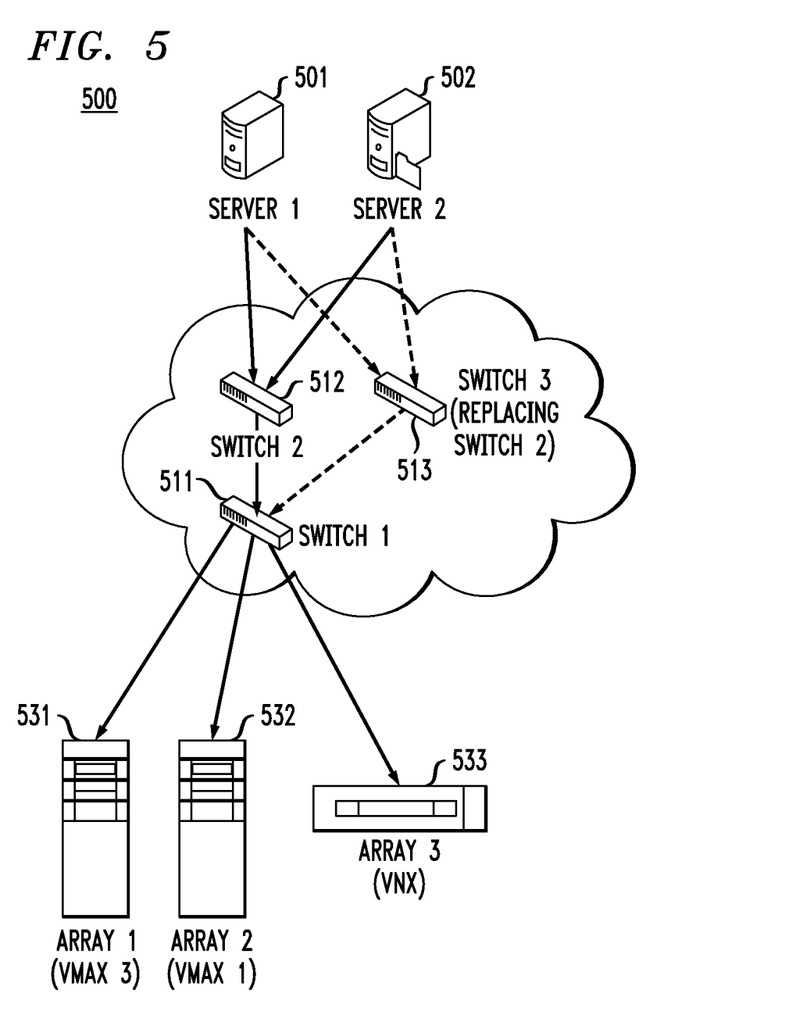
FIG. 5 illustrates an environment for which a placeholder element is created, in accordance with an embodiment of the present invention.

Referring to FIG. 5, in another non-limiting illustrative example, a user plans to replace an existing switch (Switch2 512) with a new switch (Switch3 513) from a different vendor. The new switch has not been delivered on site (or is unavailable for some other reason). A logical placeholder switch is created automatically, or by the user, using a template of the switch from the new vendor.

As shown in FIG. 5, the environment 500 includes two hosts: Server1 501 and Server2 502. There are two switches: Switch1 511 and Switch2 512. There are three arrays: Array1 531, Array2 532 and Array3 533. The user wants to retire Switch2 512 and replace it with Switch3 513. As noted above, Switch2 and Switch3 are from different vendors. The concepts that are used by vendors to configure switches vary, but there are similarities in what is required in order for the switches to communicate with each other. The similarities include, for example, the switches having physical ports, fabrics to group ports from multiple switches together, and created zones so that, between ports, connected assets are visible to each other. For example, one possible way for Server1 to be visible to Array1 is using the following zones: Zone1 on Switch1, where one port is connected to a port on Server1, and a second port on Switch1 is connected to a port on Switch2; and Zone2 on Switch2, where one port is connected to a port on Switch1, and a second port on Switch2 is connected to a port on Array1.

There are also unique identifiers that are specific to switches which can be merged, e.g., each switch has a unique identifier, each port has a unique identifier, and each fabric has a unique identifier.

In this example, Switch2 512 is used as a base asset when creating the placeholder switch. The ports, fabrics, zones, etc. are added to the placeholder switch using this base. As Switch2 512 is not the same model as Switch3, it is recommended to use a template of a switch which is of type Switch3. This is applied as a base on top of the placeholder switch.

If a user is able to provide the serial number of the replacement switch, it may be possible to create most of the configurations on Switch3 without merging the placeholder switch with the Switch3 when it is available. This includes switch WWN, fabric WWN if a fabric is created on Switch3 and port WWN.

If the user decides to change the make and model of Switch3 during the planning stage, it is a relatively simple process to update the template of the placeholder switch and the unique identifier. All other required updates are automatic.

In accordance with embodiments of the present invention, the configurations from the existing switch are automatically applied to the new switch, e.g. fabrics, virtual storage area networks (VSANs), zones, etc. When the new switch is available, the configuration of the new switch is automatically merged with that of the placeholder switch. Unique identifiers are taken from the new switch, e.g. world-wide name (WWN), serial number, etc., and other configurations are merged.

Figure 6:
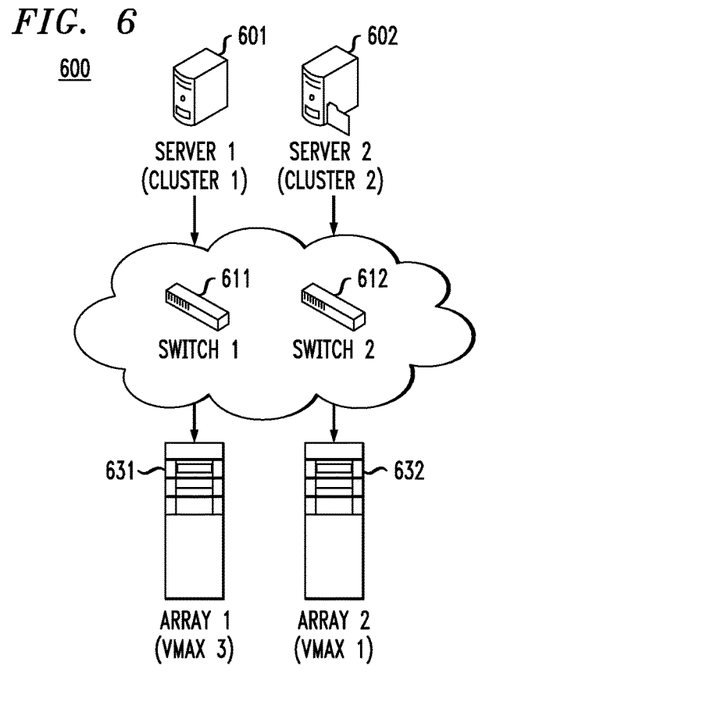
FIG. 6 illustrates an environment for which a placeholder element is created, in accordance with an embodiment of the present invention.

Referring to FIG. 6, in another non-limiting illustrative example, an environment 600 includes Server1 601, Switch1 611, Switch2 612, Array1 631 and Array2 632. A user plans to add a new server (Server2 602) to a cluster for fault tolerance. The new server has not been delivered on site (or is unavailable for some other reason). A logical placeholder server is created automatically, or by the user, by cloning the existing server (and using a server template if the hardware configuration is different).

In this example, the make and model of the Server2 is different from Server1. A template is available for the make and model of Server2 that is being added. As the new server will be a used for fault tolerance, it appears that a preferred option would be to clone Server1 601 to create a placeholder asset for Server2 602. A template of the make and model of Server2 is applied on top of the placeholder server.

The configuration of placeholder asset for Server2 602 can be modified automatically, or by the user, based on the expected configuration of the new server, e.g., to input a WWN of a host bus adapter (HBA), add a new HBA, add additional memory, etc. When the server becomes available, its configuration is automatically merged with that the placeholder server. Unique identifiers are taken from the new server, e.g. media access control addresses (MAC addresses), WWNs, etc., and other configurations are merged.

Figure 7:
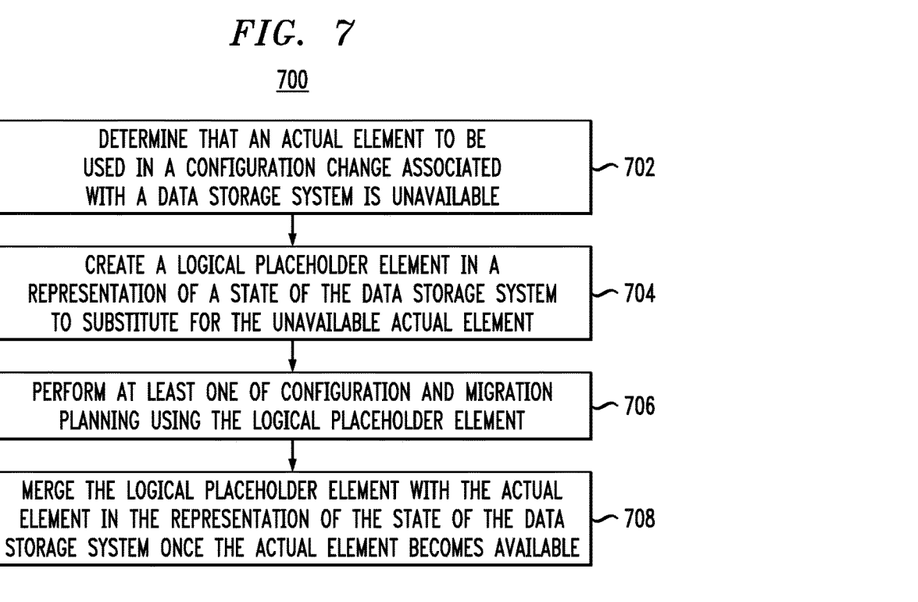
FIG. 7 is a flow chart showing a method for asset modeling and migration planning using a placeholder element, in accordance with an embodiment of the present invention.

FIG. 7 is a flow chart showing a method for asset modeling and migration planning using a placeholder element, in accordance with an embodiment of the present invention. Unless otherwise stated, the order or number of steps set forth in FIG. 7 is not necessarily limited to what is shown, and may be subject to change. It should be understood that the structure of the flow chart set forth in FIG. 7 be viewed as exemplary rather than as a requirement or limitation of the invention.

Referring to FIG. 7, the method 700 comprises, at block 702, determining that an actual element to be used in a configuration change associated with a data storage system is unavailable, and at block 704, creating a logical placeholder element in a representation of a state of the data storage system to substitute for the unavailable actual element. A configuration of the logical placeholder element in the representation of the state of the data storage system is based on one or more settings in the unavailable actual element. The one or more settings in the unavailable actual element can be based on a configuration of an existing element being replaced by the actual element. The actual element can be, for example, a host, switch, fabric, array, server, or a cloud entity.

The method further comprises, at block 706, performing at least one of configuration or migration planning using the logical placeholder element, and, at block 708, merging the logical placeholder element with the actual element in the representation of the state of the data storage system once the actual element becomes available. The merging can include reconciling a configuration of the actual element with the configuration of the logical placeholder element, wherein the reconciling comprises identifying conflicts between the configuration of the actual element and the configuration of the logical placeholder element. The configuration and/or migration planning can be altered based on the conflicts. The merging can also include taking unique identifiers, such as, for example, a serial number, a worldwide name, and a media access control address from the actual element.

The method can also include selecting at least one of a template or an existing element on which the logical placeholder element will be based, and the logical placeholder element can be created by cloning an existing element, building the logical placeholder element from scratch, and/or building the logical placeholder element from a template configuration.

The method may further include automatically detecting, with respect to the logical placeholder element, dependencies with other elements, and generating scripts using the logical placeholder element, wherein the scripts are configured to be run against the actual element.

The representation of the state of the data storage system can be a snapshot in an event window, wherein the snapshot comprises at least one of a migration state snapshot and a production state snapshot.

Figure 8:
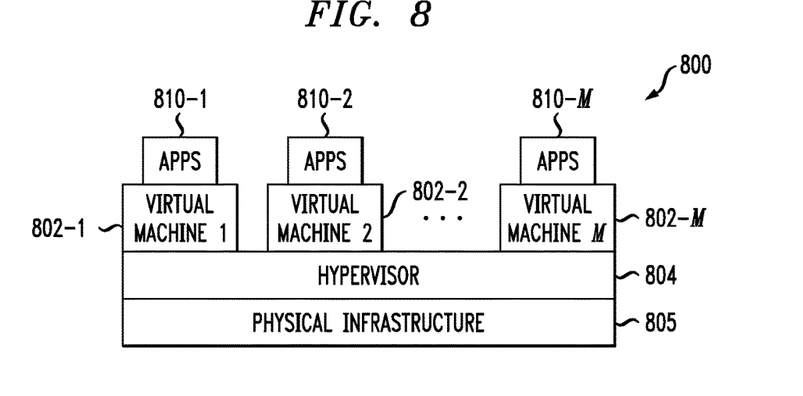
FIGS. 8 and 9 show examples of processing platforms that may be utilized to implement at least a portion of the systems of FIGS. 1 and 2.

As shown in FIG. 8, the cloud infrastructure 800 comprises virtual machines (VMs) 802-1, 802-2, . . . 802-M implemented using a hypervisor 804. The hypervisor 804, as mentioned above, is an example of what is more generally referred to herein as "virtualization infrastructure." The hypervisor 804 runs on physical infrastructure 805 (e.g., such as may include CPUs and/or storage devices). The cloud infrastructure 800 further comprises sets of applications 810-1, 810-2, . . . 810-M running on respective ones of the virtual machines 802-1, 802-2, . . . 802-M (utilizing associated LUNs) under the control of the hypervisor 804.

Although only a single hypervisor 804 is shown in the example of FIG. 8, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 804 which, as shown in FIG. 8, is directly inserted on top of the computer hardware in order to allocate hardware resources of the physical computer (physical infrastructure 805) dynamically and transparently. The hypervisor 804 affords the ability for multiple operating systems to run concurrently on a single physical computer and share hardware resources with each other. The hypervisor 804 thus also manages disk I/O scheduling associated with the workloads performed by each virtual machine.

An example of a commercially available hypervisor platform that may be used to implement portions of the cloud infrastructure 800 in one or more embodiments of the invention is the VMware® vSphere® which may have an associated virtual infrastructure management system such as the VMware® vCenter™. The underlying physical infrastructure 805 may comprise one or more distributed processing platforms that include storage products such as VNX and Symmetrix® VMAX, both commercially available from EMC Corporation of Hopkinton, Mass. A variety of other storage products may be utilized to implement at least a portion of the cloud infrastructure 800.

Figure 9:
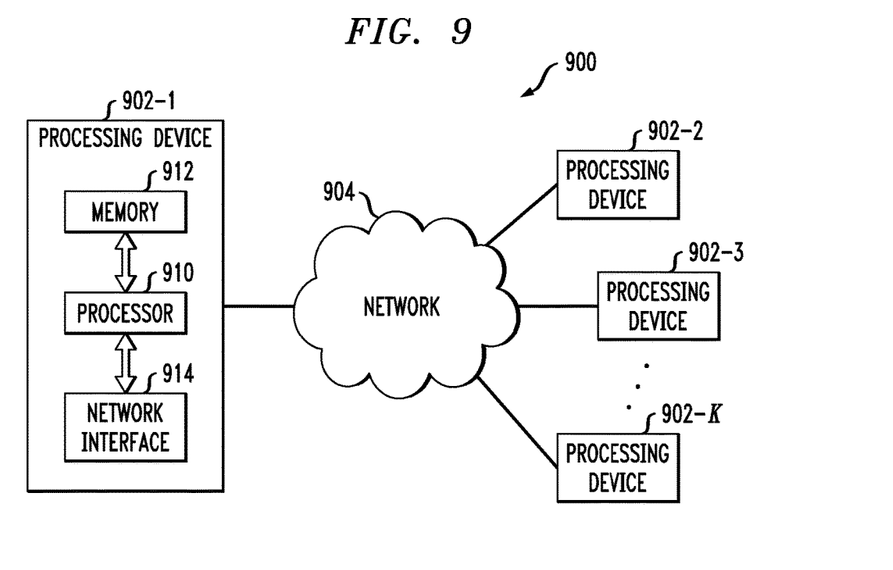

An example of a processing platform on which the cloud infrastructure 800 and/or the asset configuration and migration management system 140 and placeholder element engine 142 of FIG. 1 may be implemented is processing platform 900 shown in FIG. 9. The processing platform 900 in this embodiment comprises at least a portion of the system 100 and includes a plurality of processing devices denoted 902-1, 902-2, 902-3, . . . 902-K, which communicate with one another over a network 904. One or more of the elements of system 100 may therefore each run on one or more computers or other processing platform elements, each of which may be viewed as an example of what is more generally referred to herein as a "processing device." As illustrated in FIG. 9, such a device generally comprises at least one processor 910 and an associated memory 912, and implements one or more functional modules for controlling certain features of system 100. Again, multiple elements or modules may be implemented by a single processing device in a given embodiment.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random access memory (RAM), read-only memory (ROM) or other types of memory, in any combination. The one or more software programs when executed by a processing device such as the processing device 902-1 causes the device to perform functions associated with one or more of the elements of system 100. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the server with the network 904 and other system components. Such circuitry may comprise conventional transceivers of a type well known in the art.

The other processing devices 902 of the processing platform 900 are assumed to be configured in a manner similar to that shown for processing device 902-1 in the figure.

The processing platform 900 shown in FIG. 9 may comprise additional known components such as batch processing systems, parallel processing systems, physical machines, virtual machines, virtual switches, storage volumes, logical units, etc. Again, the particular processing platform shown in FIG. 9 is presented by way of example only, and system 100 of FIG. 1 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, embodiments of the present invention provide a placeholder element that can be automatically configured and used during asset modeling and migration planning when a configuration element is not available. In accordance with an embodiment of the present invention, a placeholder configuration element can be created on which the user can update the configuration of the element with changes that are required, and when the actual element is available, its configuration can be automatically merged with the placeholder configuration. Accordingly, by substituting the configuration element with a placeholder configuration element, and not having to wait for the actual configuration element to arrive, users are able to complete more planning offsite before an element is delivered, reduce the number of unexpected configuration changes, and reduced the time on site for completing the configuration changes.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   determining that an element to be used in a configuration change associated with a data storage system is unavailable;
   creating a logical placeholder element in a representation of a state of the data storage system to substitute for the unavailable element;
      wherein a configuration of the logical placeholder element in the representation of the state of the data storage system is based on one or more settings in the unavailable element;
   performing at least one of configuration and migration planning using the logical placeholder element; and
   merging the logical placeholder element with the element in the representation of the state of the data storage system once the element becomes available;
   wherein one or more of the determining, creating, performing and merging steps are executed via at least one processor coupled to a memory.

2. The method according to claim 1, wherein the element is one of a host, switch, fabric, array, server, and a cloud entity.

3. The method according to claim 1, further comprising selecting at least one of a template or an existing element on which the logical placeholder element will be based.

4. The method according to claim 1, wherein the logical placeholder element is created by at least one of cloning an existing element, building the logical placeholder element from one or more design specifications without a predetermined template, and building the logical placeholder element from a template configuration.

5. The method according to claim 1, further comprising automatically detecting, with respect to the logical placeholder element, dependencies with other elements.

6. The method according to claim 1, wherein the merging comprises reconciling a configuration of the element with the configuration of the logical placeholder element.

7. The method according to claim 6, wherein the reconciling comprises identifying conflicts between the configuration of the element and the configuration of the logical placeholder element.

8. The method according to claim 7, further comprising altering at least one of the configuration or migration planning based on the conflicts.

9. The method according to claim 1, wherein the merging comprises taking unique identifiers from the element.

10. The method according to claim 9, wherein the unique identifiers comprise at least one of a serial number, a world-wide name, and a media access control address.

11. The method according to claim 1, wherein the one or more settings in the unavailable element are based on a configuration of an existing element being replaced by the element.

12. The method according to claim 1, further comprising generating scripts using the logical placeholder element, wherein the scripts are configured to be run against the element.

13. The method according to claim 1, wherein the representation of the state of the data storage system is a snapshot in an event window.

14. The method according to claim 13, wherein the snapshot comprises at least one of a migration state snapshot and a production state snapshot.

15. An article of manufacture comprising a processor-readable storage medium having encoded therein executable code of one or more software programs, wherein the one or more software programs when executed by a processor device implement the steps of:
  determining that an element to be used in a configuration change associated with a data storage system is unavailable;
  creating a logical placeholder element in a representation of a state of the data storage system to substitute for the unavailable element;
    wherein a configuration of the logical placeholder element in the representation of the state of the data storage system is based on one or more settings in the unavailable element;
  performing at least one of configuration and migration planning using the logical placeholder element; and
  merging the logical placeholder element with the element in the representation of the state of the data storage system once the element becomes available.

16. An apparatus comprising:
a memory; and
a processor operatively coupled to the memory and configured to:
  create a logical placeholder element in a representation of a state of a data storage system to substitute for an unavailable element to be used in a configuration change associated with the data storage system;
    wherein a configuration of the logical placeholder element in the representation of the state of the data storage system is based on one or more settings in the unavailable actual element;
  perform at least one of configuration and migration planning using the logical placeholder element; and
  merge the logical placeholder element with the element in the representation of the state of the data storage system once the element becomes available.

17. The apparatus according to claim 16, wherein the processor is further configured to select at least one of a template or an existing element on which the logical placeholder element will be based.

18. The apparatus according to claim 16, wherein the logical placeholder element is created by at least one of cloning an existing element, building the logical placeholder element from one or more design specifications without a predetermined template, and building the logical placeholder element from a template configuration.

19. The apparatus according to claim 16, wherein the processor is further configured to generate scripts using the logical placeholder element, wherein the scripts are configured to be run against the element.

20. The apparatus according to claim 16, wherein:
merging comprises reconciling a configuration of the element with the configuration of the logical placeholder element; and
the reconciling comprises identifying conflicts between the configuration of the element and the configuration of the logical placeholder element.

\* \* \* \* \*